United States Patent [19]

Yocom

[11] Patent Number: 5,031,110

[45] Date of Patent: Jul. 9, 1991

[54] SYSTEM FOR MONITORING ELECTRICAL CONTACT ACTIVITY

[75] Inventor: Thomas M. Yocom, N. Lauderdale, Fla.

[73] Assignee: ABB Power T&D Company Inc., Blue Bell, Pa.

[21] Appl. No.: 396,152

[22] Filed: Aug. 21, 1989

[51] Int. Cl.[5] .............................................. G05B 21/02

[52] U.S. Cl. .................................... 364/481; 364/550; 364/183; 361/1; 324/537

[58] Field of Search ............... 364/550, 480, 481, 178, 364/183; 361/1, 111; 307/30, 31; 324/537, 500

[56] References Cited

U.S. PATENT DOCUMENTS

| | | | |
|---|---|---|---|
| 4,636,967 | 1/1987 | Bhatt et al. | 364/550 |
| 4,845,475 | 7/1989 | Cooledge et al. | 364/550 |
| 4,885,676 | 12/1989 | Zewighaft | 364/178 |
| 4,937,763 | 6/1990 | Mott | 364/550 |
| 4,964,058 | 10/1990 | Brown, Jr. | 364/481 |

*Primary Examiner*—Parshotam S. Lall
*Assistant Examiner*—Brian M. Mattson
*Attorney, Agent, or Firm*—Richard V. Westerhoff

[57] ABSTRACT

A microcomputer repetitively samples a signal representative of the instantaneous state of an electrical contact and initiates a count in response to the first sample which indicates a contact state different from a stored status of the contact. The microprocessor counts up for samples indicating an active state of the contact and down for inactive samples. If the count increases to a predetermined count representing a certain net count of active samples when the stored status is inactive, the stored status is changed to active. Similarly, the stored status is changed from active to inactive if the count decreases to a predetermined count representing a certain net count of inactive samples. The time of the first sample which indicates a contact state different from the stored status of the contact is stored as a temporary time. If the stored contact status is changed, the stored temporary time is saved as the valid time of the change in status. The microcomputer maintains lists of contacts having an active status and those having an inactive status and keeps track of a separate sample count for each contact monitored.

11 Claims, 3 Drawing Sheets

SYSTEM FOR MONITORING ELECTRICAL CONTACT ACTIVITY

BACKGROUND OF THE INVENTION

1. Field of the Invention

This invention is directed to apparatus for identifying true changes in state of electrical contacts which tend to bounce and for time stamping such changes. The invention has particular application in identifying and time stamping true changes in the state of the contacts in protective relays in electric power distribution systems.

2. Background Information

In many applications, it is desirable to record the time, referred to as time stamping, of electrical contact activity. Bouncing contacts pose a problem for time stamping. Waiting until a contact stabilizes before time stamping may be too inaccurate in some applications, and time stamping upon initial contact activity, though chronologically precise, may result in noise time stamping as well as multiple time stamps for a single contact toggle.

One type of apparatus where contact bounce is a particular problem is protective relays for electric power distribution systems. These relays include contacts operating a trip circuit to open a circuit breaker in response to the detection of fault currents in a protected section of a power line, and often also include contacts in alarm circuits, pilot circuits and for other functions. Such contacts tend to bounce on both opening and closing and may open and close in response to disturbances, such as may be caused by lightning.

It is desirable to accurately know the state of many of these protective relay contacts and to know within milliseconds the time of any change in the state of the contacts.

There is a need therefore for apparatus which accurately and reliably determines the state of electrical contacts which tend to bounce.

There is a further need for such apparatus which accurately and reliably time stamps contact activity.

There is an additional need for such apparatus which is flexible and can be easily adapted for contacts with different characteristics.

SUMMARY OF THE INVENTION

These and other needs are satisfied by the invention which is directed to a system for determining the active and inactive status of an electrical contact which tends to bounce upon opening or closing. The system includes a circuit generating a state signal representing the instantaneous state of the contact. A microcomputer repetitively samples this signal and compares it to a stored status for the contact. In response to the first sample indicating an instantaneous contact state different from the stored status of the contact, the microcomputer begins a count of state signal samples, counting in one direction for samples having one state and in the other direction for samples having the other state. The microcomputer changes the stored status of the contact if this count reaches a predetermined net count of samples having a state different from the stored status of the contact.

The system of the invention also saves as a temporary time, the time of the first sample having a state different from the stored status of the contact. This temporary time is stored as the valid time for a change in status of the contact if the predetermined net count is reached.

On the other hand, if the count reaches a preselected net count of samples having the same state as the stored status of the contact, this is an indication that the contact has not achieved a stable change of state and the temporary time is cleared.

In the preferred embodiment of the invention, the microcomputer always counts up for active samples, that is samples representing an instantaneous active state of the contact, and down for inactive samples. Thus, when the stored contact status is inactive, the status is changed to active only if the count reaches a predetermined high count. Similarly, the stored status is changed from active to inactive only if the count reaches a predetermined low count. The count is initially set to a starting value between these predetermined high and low counts before a count is begun. If the stored status is inactive, and the inactive samples predominate so that the count reaches the predetermined low count, the temporary time is cleared. Likewise, the temporary time is cleared if the stored status is active and the count reaches the predetermined high count. In both these instances, there is no valid change in status of the contact, and the system waits for the next sample which is different from the stored contact status to initiate a new count.

The microcomputer can monitor a number of contacts and maintains lists of contacts for which the stored status is active and those for which the stored status is inactive. In addition, a separate count is maintained for each contact monitored.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT OF THE INVENTION

The invention will be described as applied to electrical contacts on protective relays in an electric power distribution system to which it is particularly applicable, however, it will be realized by those skilled in the art that the invention is also useful in monitoring contact activity in other applications.

Figures 1, 2:
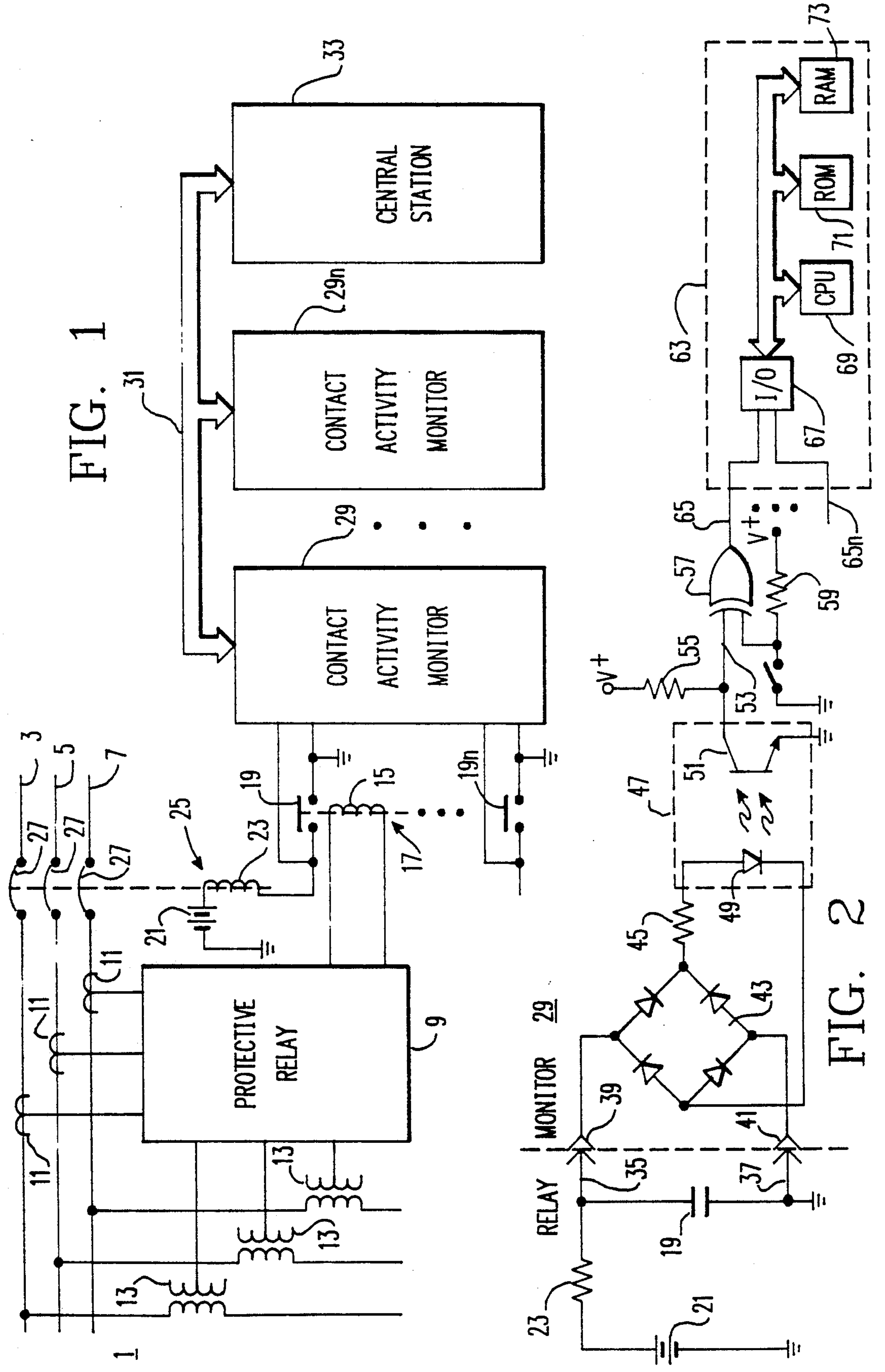
FIG. 1 is a schematic view of a portion of an electric power distribution system with a protective relay to which the system for monitoring electrical contact activity of the present invention is applied.
FIG. 2 is a schematic diagram of the system for monitoring electrical contact activity shown in FIG. 1.

Referring to FIG. 1, the electric power distribution system 1 includes three conductors 3, 5 and 7 of a three phase power line segment which is protected by a protective relay 9. Such protective relays 9 are well known in the art. Typically, the protective relays, such as 9, monitor the current on the conductors 3, 5 and 7 through current sensors 11 and the voltage through potential transformers 13. The various types of protective relays analyze the currents and voltages, in the case of some relays using additional information from other relays, to detect abnormal conditions in the distribution system. If the conditions detected meet predetermined criteria, the protective relay 9 energizes the coil 15 of the trip relay 17 having a contact 19 which, when closed, provides current from a station battery 21 to the coil 23 of the circuit breaker 25 which opens a contact 27 to interrupt the flow of current through the conductors 3, 5 and 7.

The status of the contact 19, which is an indication of the status of the circuit breaker 25, is monitored by the contact activity monitor 29 of the invention. The contact activity monitor 29 can also monitor other contact outputs up to 19*n* of the protective relay 9. The contact activity monitor 29, and, if desired, additional contact activity monitors associated with other protective relays such as the monitor 29*n* can be connected through a communications link 31, such as a local area network, to a central processing station 33 which gathers status and time stamping information on all of the contacts.

As shown in FIG. 2, a pair of leads 35 and 37 are connected to measure the voltage across the contact 19 to be monitored. The contact 19 is "wet." That is, power, such as provided by battery 21, is applied across the contact 19 continuously so that with the contact open the voltage of the power supply 21 appears on the leads 35 and 37. With the contact 19 closed, substantially all of the voltage drop is across the load 23.

The voltage across contact 19 is applied by the leads 35 and 37 through connectors 39 and 41 to the contact activity monitor 29. A full wave rectifier bridge 43 assures proper polarity of dc voltages and enables the monitor to be used with contacts controlling ac currents. The voltage regulator 45 in the form of a linear voltage limiter limits the magnitude of the rectified signal. The rectified and regulated voltage is applied to an opto-isolator 47 having an LED 49 input stage and a photodiode 51 output stage. The output lead 53 of the opto-isolator 47 is connected though a pull-up resistor 55 to a voltage source V+. With the contact 19 open, the LED 49 emits turning on the photodiode 51 which pulls lead 53 down to essentially ground. With the contact 19 closed, the photodiode 51 is off, and the voltage V+ appears on the output lead 53.

The output lead 53 is connected to one input of an exclusive OR circuit (XOR) 57. The other input of 57 is connected through a resistor 59 to the V+ voltage source. The output of the XOR 57 is high when the contact 19 is closed and low when it is open. If desired, a switch 61 can be used to ground the second input to the XOR 57. With the switch 61 closed, the XOR output is high when the contact 19 is open and low when closed. The arrangement can be used to selectively generate an active status (XOR output high) when the contact 19 is closed by opening the switch 61, or when the contact 19 is open by closing the switch 61. Alternatively, the lead 53 can be connected directly to the input of a microcomputer 63.

The microcomputer 63, which is conventional, includes an input/output interface 67 interconnected with a CPU 69, a read only memory (ROM) 71 and a random access memory (RAM) 73 by a bus 75. The ROM 71 stores the program used by the CPU 69 to process signals received from XOR 57, and the RAM 73 stores the processed data and other parameters.

In accordance with the invention, the microcomputer 63 continually samples the analog signal representing the instantaneous state of the contact 19. The sampling rate depends upon the characteristics of the contact 19 and the application in which it is used. In the exemplary system in which the contact 19 is part of a protective relay for an electric owner distribution system, the analog signal is sampled every 1.14428 milliseconds. In such a system, it is important to know when certain contacts, such as those controlling the trip circuit, change state within a fraction of the 16.7 millisecond power cycle. However, the contacts tend to bounce, both on opening and closing. Waiting until the contact stabilizes can result in inaccurate timing of a change in state of the contact. On the other hand, responding to the initial change in state can result in recording noise and multiple indications of a single change in state.

The invention eliminates these problems by maintaining a list of the status of each contact being monitored, and upon the first indication of a change in status, as indicated by an analog signal sample with a state different from the stored status, a count is begun. In the exemplary system, the microcomputer counts up for samples indicating an instantaneous active state for a contact and counts down for samples indicating an inactive state. The count is set to a value K when the stored status of the contact is inactive, and the first active sample is detected. For every subsequent active sample, the count is incremented, and for each inactive sample, the count is decremented. The sequence of active and inactive samples is a function of the frequency of oscillation of the bouncing contact and the sampling rate. If the net count reaches a count L, the contact is considered to have changed to the active state, and the stored status of the contact is changed to active. In order to time stamp the change in status of the contact, the time of the first occurrence of an active sample is stored as a temporary time. When the count reaches L and the status of the contact is changed to active, the temporary time is stored as the valid time for the change in status of the contact. Should inactive samples predominate and the count reach zero, indicating that a true change in contact status has not occurred, the temporary time is cleared.

When the stored status of the contact is active, the count is set to M upon the occurrence of the first inactive sample, and the time is temporarily stored. If the net count reaches zero, the stored status of the contact is changed to inactive, and temporary time is recorded as the valid time for the change in contact status. However, should the net count reach L, the temporary time is cleared, and the stored status remains active.

In the exemplary system, the variables K, L, and M are set to 3, 7 and 3, respectively. Again, these values are selected for the characteristics of the contact being monitored and are programmable, so that for instance, if required, different values of these parameters can be set for different contacts on the same relay or on different relays monitored by the same system.

The starting values K and M for the count are set between the limits L and zero so that the temporary time is not cleared if the first sample with a state which is different from the stored status of the contact is followed by a sample of the same state as the stored status. Since the count is reset to K or M upon the occurrence of a sample with a state which is different from the stored contact status, it does not matter whether the count is held at L counting in the up direction or to zero counting in the down direction. The count is not relevant as long as the state of the samples remains the same as the stored status of the contact indicating a stable condition.

In the preferred embodiment of the invention, the count is reset to K if an active sample is detected with the count below K. Similarly, the count is reset to M if an inactive sample is detected with the count above M. This is done so that only L-K consecutive active samples are required at any time to change the stored status of the contact from inactive to active, and only M consecutive inactive samples are required to change the stored status from active to inactive. Of course, with this arrangement, at least K consecutive inactive samples are required to clear the temporary time and maintain the inactive stored status of the contact while at least L-M consecutive active samples are required to maintain the active stored status of the contact and clear the temporary time.

In accordance with the invention, the microcomputer cyclically samples the analog instantaneous contact state for each of the monitored contacts on the protective relay 9 and maintains a separate count for each such contact. As previously mentioned, the values of the parameters K, L and M can be separately set for each contact if desired.

Figure 3A:
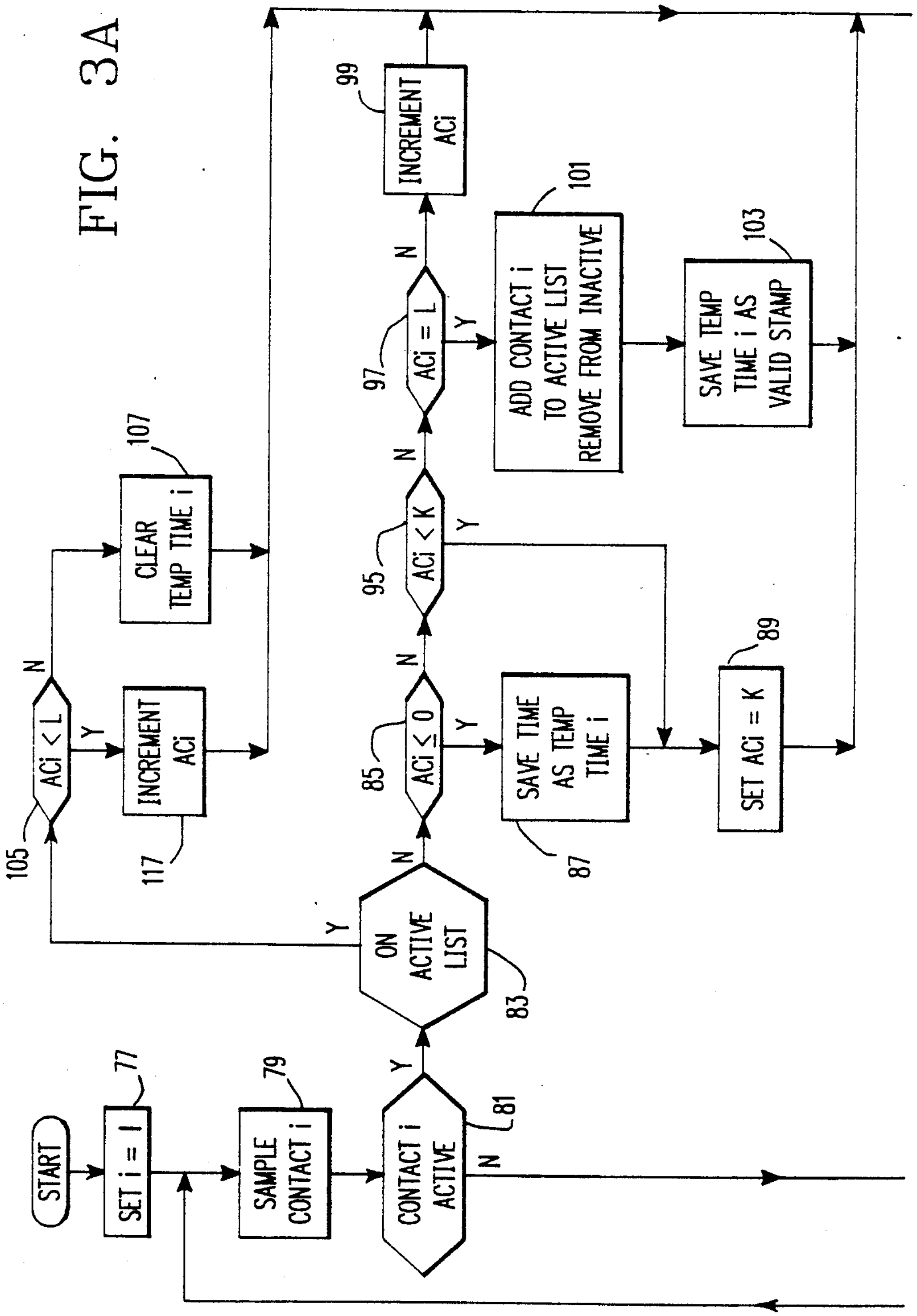
FIGS. 3A and 3B when placed one above the other illustrate a flowchart of a suitable computer program for use in the system of FIG. 2 to implement the invention.
Figure 3B:
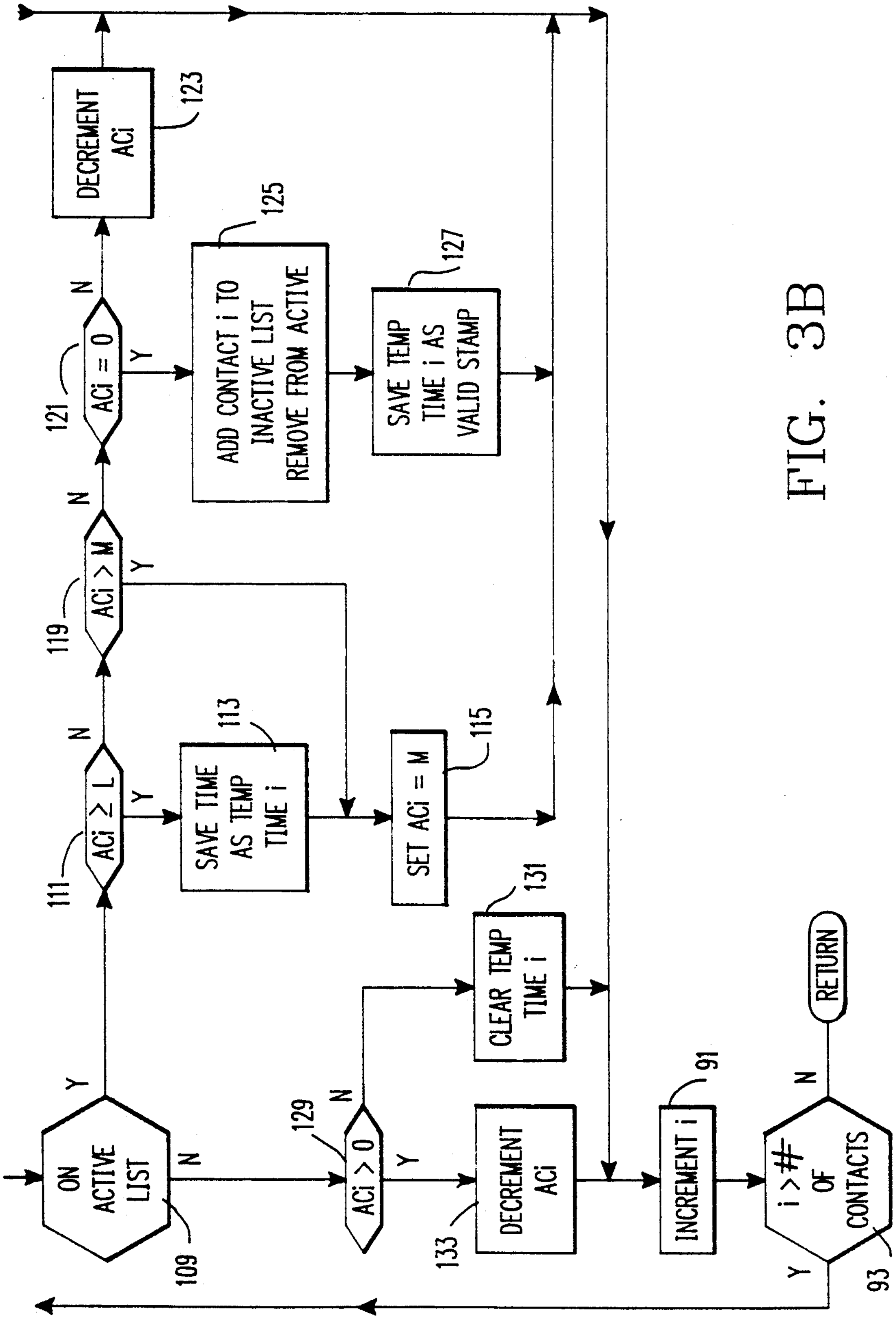

A flowchart for a suitable program for implementation of the invention by the microcomputer is shown in FIGS. 3A and 3B. Upon initial entry of the program, i, the index identifying the individual contacts, is set to 1 at 77. The analog instantaneous contact state signal for the contact i is then sampled at 79. If the sample indicates that the contact i is active as determined at 81, but is not on the active list as determined at 83, and the count Aci is less than or equal to zero as determined at 85 indicating that this is the first sample where the contact i, having a stored status of inactive, has tested active, then the time is saved at 87 as the temporary time, and the count is set to K at 89. The index i is then incremented at 91, and since this is only the first of several contacts as determined at 93, the program loops back to sample the next contact at 79 in the same manner. The analog instantaneous contact state signal for each contact is similarly sampled.

The next time the program is run, assume that the sample for contact i is also active as determined at 81. It will still not be on the active list, will not be equal to or less than zero and will not be less than K, (since it was just set equal to K) and will not be equal to L as determined at 83, 85, 95 and 97 respectively. As a result, the count will be incremented at 99. Assuming that on subsequent runs of the program, the contact i is also active and that the count reaches L at 97, the contact i will be added to the active list and removed from an inactive list at 101 thereby recording the change in status to active, and the temporary time will be saved as the valid time stamp of the change in contact status at 103. At anytime before the count reaches L, should the count fall below K as determined at 95, it is reset to K at 89 so that as previously discussed, any L-K consecutive active samples will result in a change in the stored status.

Assuming the next sample of this contact is again active, it will now be on the active list as determined at 83, and since the count will not be less than L as determined at 105, the temporary time will be cleared at 107.

Consider now that on a subsequent run of the program, the analog instantaneous contact state signal for the contact i is inactive as determined at 81. Since the contact i is on the active list as determined at 109 and the count is more than or equal to L as determined at 111 indicating that this is the first inactive sample for a contact on the active list, the time is saved as the temporary time at 113, and the count is set to M at 115.

Assume that the next sample of the contact i is active as determined at 81. Since it is on the active list and the count is now less than L as determined at 83 and 105, respectively, the count is incremented at 117. If the contact is also active on subsequent samples so that the count reaches L as determined at 105, the earlier inactive sample is considered noise, and the temporary time is cleared at 107. However, if before the count reaches L an inactive sample is detected at 81, the count will be less than M at 119 and will be reset to M at 115. If the next sample indicates that the contact is inactive, the count will still be equal to M, and hence, not equal to zero when tested at 121, and the count will be decremented at 123. If additional inactive samples bring the count down to zero when tested at 121, the contact i is added to the inactive list and removed from the active list at 125, and the temporary time is saved as the valid time of the change in contact status at 127. Assuming that the contact is also inactive when next sampled at 81, it will not be on the active list as determined at 109, and the count will not be more than zero when tested at 129 so that the temporary time will be cleared at 131.

With the contact on the inactive list, subsequent active samples will cause the count to be incremented from K as previously described. Should the contact then test inactive on a sample, the count will be more than zero at 129 and will be decremented at 133. If successive inactive samples bring the count down to zero at 129, the previous indications of a change in status are taken as false, and the temporary time is cleared at 131.

The present invention provides a flexible, accurate system for determining the status of electrical contacts which bounce or oscillate and for recording the time at which there is a valid change of state of the contacts.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A system for determining an active status and inactive status of an electrical contact comprising:

means generating an instantaneous state signal for the contact having an active state when the contact is in an active state and having an inactive state when the contact is in an inactive state;

means maintaining a stored status of said contact;

means sampling said instantaneous state signal generated by said means for generating an instantaneous state signal repetitively and generating state signal samples;

means beginning a count of said state signal samples when a state of a state signal sample generated by said means for sampling said instantaneous state signal repetitively and generating state signal samples is first different from the stored status of said contact stored in said means for maintaining a stored status of said contact, counting in one direction for one state of the state signal sample and counting in a second direction for a second state of the state signal sample; and means changing the stored status of the contact stored in said means for maintaining a stored status of said contact if the count reaches a predetermined net count of samples having a state different from the stored status of the contact.

2. The system of claim 1 including means saving as a temporary time, a time of a first sample generated by said means for generating such samples having a state different from the stored status of the contact stored in the means for maintaining the stored status of said contact, and means responsive to the means changing the stored status of the contact to store said temporary time as a valid time for the change of status of the contact.

3. The system of claim 2 including means clearing said means storing said temporary time if said count reaches a preselected net count of samples having a same state as the stored status of said contact.

4. A system for determining an active status and inactive status of an electrical contact comprising:

means generating an instantaneous state signal for the contact having an active state when the contact is in an active state and having an inactive state when the contact is in an inactive state; and a digital computer programmed;

to maintain a stored status of said contact;

to sample said instantaneous state signal repetitively and generate state signal samples;

to begin a count of said state signal samples in response to a first sample generated by said means for generating state signal samples having a state different from the stored status of said contact stored in said means for maintaining a stored status of said contact, counting in a first direction for samples having an active state and counting in a second direction for samples having an inactive state, and when the stored status of the contact is active to change the stored status to inactive if said count reaches a preselected net count of inactive samples, and when the stored status of the contact is inactive, to change the stored status to active if the count reaches a preselected net count of samples with an active status.

5. The system of claim 4 wherein said digital computer is further programmed to temporarily store as a temporary time, a time of a first sample which is different from the stored status of the contact, and to record said temporary time as a valid time when the stored status of said contact is changed.

6. The system of claim 5 wherein said digital computer is further programmed to clear said stored temporary time when the stored status of the contact is active and the count reaches said preselected net count of samples with an active state, and to clear said stored temporary time when the stored status of the contact is inactive and said count reaches said preselected net count of samples with an inactive state.

7. The system of claim 4 wherein said digital computer is further programmed to begin the count by setting the count to a first starting count when the stored status of the contact is active and to begin said count at a second starting count when the stored status of the contact is inactive.

8. The system of claim 7 wherein said first direction of counting is up and said second direction of counting is down, wherein said preselected net count of samples having an inactive state is below said first and second starting counts and the preselected net count of active samples is above said first and second starting counts, and wherein said digital computer is further programmed to reset the count to said first starting count in response to a sample having an inactive state when the stored status of the contact is active and the count is above said first starting count, and to reset the count to said second starting count in response to a sample having an active state when the stored status of said contact is inactive and the count is below said second starting count.

9. The system of claim 8 wherein said digital computer is programmed to respond to a first sample having a state different from the stored contact status as a first inactive sample when the stored contact status is active and the count is at least as high as the preselected net count of samples with an active status, and to respond to a first sample with an active status when the stored status is inactive with the count at least as low as the preselected net count of inactive samples.

10. The system of claim 4 for determining the active status and inactive status of a plurality of contacts wherein the means generating said instantaneous state signal generates such an instantaneous state signal for each of said contacts, and wherein said digital computer is programmed to maintain a list of a stored status of each of said contacts, to maintain a separate count for each of said contacts and to change the stored status of each contact for which the count reaches a preset net count of samples different from the stored status of the contact.

11. The system of claim 10 wherein said digital computer is further programmed to temporarily store for each contact as a temporary time for that contact a time of the first sample for that contact which is different from the stored status for that contact, and to record the temporary time for each contact as a valid time for a change in status of that contact when the status of that contact is changed.

* * * * *